United States Patent
Rambetius

(10) Patent No.: US 12,294,326 B2
(45) Date of Patent: May 6, 2025

(54) INVERTER, ELECTRIC DRIVE, VEHICLE AND METHOD FOR CONTROLLING CONTROLLABLE SWITCHES OF AN INVERTER AND CORRESPONDING COMPUTER PROGRAM PRODUCT

(71) Applicant: Valeo eAutomotive Germany GmbH, Erlangen (DE)

(72) Inventor: Alexander Rambetius, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 194 days.

(21) Appl. No.: 18/255,347

(22) PCT Filed: Oct. 27, 2021

(86) PCT No.: PCT/EP2021/079820
§ 371 (c)(1),
(2) Date: May 31, 2023

(87) PCT Pub. No.: WO2022/117263
PCT Pub. Date: Jun. 9, 2022

(65) Prior Publication Data
US 2024/0056015 A1    Feb. 15, 2024

(30) Foreign Application Priority Data

Dec. 2, 2020 (DE) .................. 10 2020 215 182.2

(51) Int. Cl.
*H02P 27/08* (2006.01)
*B60L 15/00* (2006.01)

(52) U.S. Cl.
CPC ............ *H02P 27/08* (2013.01); *B60L 15/007* (2013.01)

(58) Field of Classification Search
CPC ........ H02P 29/68; H02P 27/085; H02P 27/06; H02P 29/032; H02P 2207/01; H02P 6/14;
(Continued)

(56) References Cited

U.S. PATENT DOCUMENTS

2006/0175995 A1    8/2006  Shinmura et al.
2010/0007300 A1    1/2010  Hein et al.
(Continued)

FOREIGN PATENT DOCUMENTS

| CN | 105577069 A | 5/2016 |
| JP | 2006-25565 A | 1/2006 |

(Continued)

OTHER PUBLICATIONS

International Search Report issued Feb. 8, 2022 in PCT/EP2021/079820 filed on Oct. 27, 2021, 2 pages.

*Primary Examiner* — Antony M Paul
(74) *Attorney, Agent, or Firm* — Oblon, McClelland, Maier & Neustadt, L.L.P.

(57) ABSTRACT

The inverter comprises input terminals (IT+, IT−), output terminals (OT), controllable switches (Q, Q') connected to the input terminals (IT+, IT−) and to the output terminals (OT), and a control device (116) configured to control the controllable switches (Q, Q') such that the controllable switches (Q, Q') convert a DC voltage (E) at the input terminals (IT+, IT−) into an AC voltage at the output terminals (OT) intended to drive an electric motor (108), the control device (116) being configured to control the controllable switches (Q, O') according to a first switching frequency and, in response to a temperature ($T_j$, $T_c$) of an element (118, Q) of the inverter (110), to a second switching frequency, the control device (116) being configured to determine the second switching frequency according to an operating point of the motor (108).

20 Claims, 4 Drawing Sheets

Figure 1:
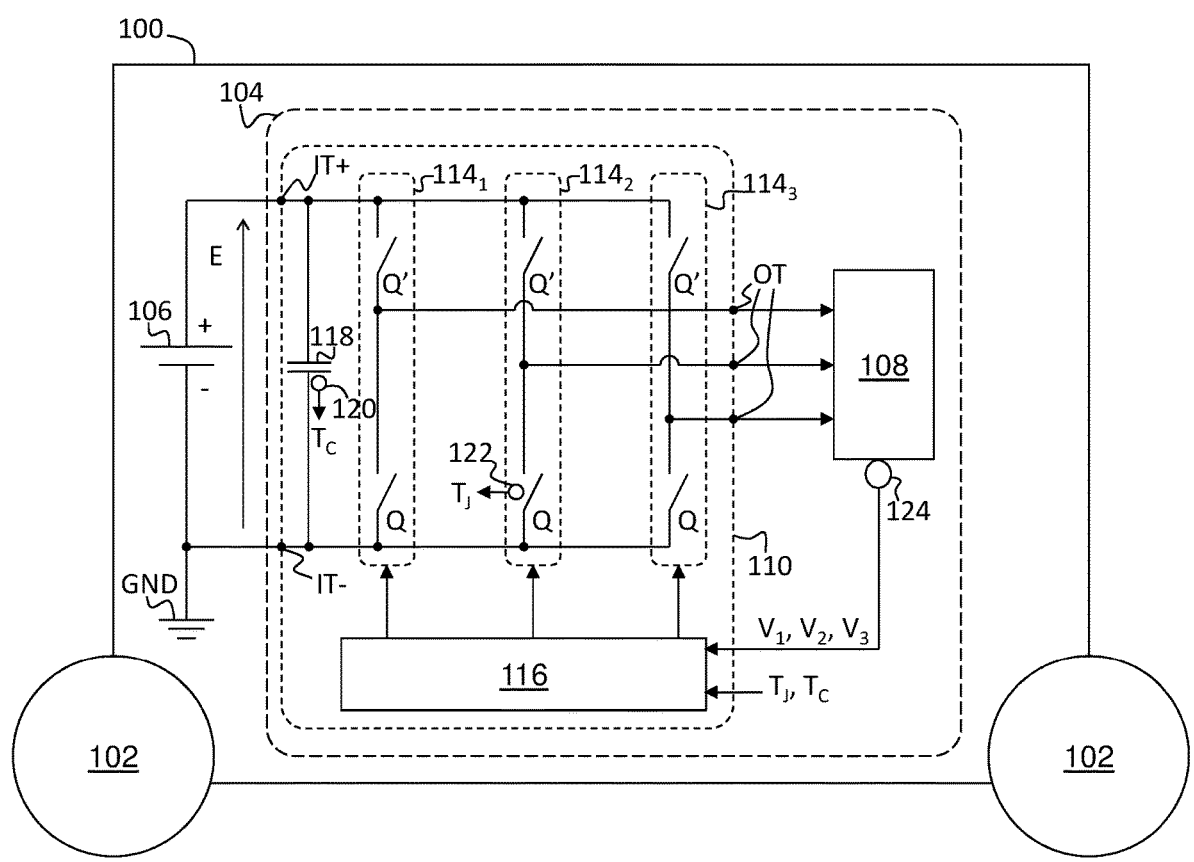

(58) Field of Classification Search
CPC .......... H02P 29/02; H02P 29/64; H02P 29/66; H02P 27/08; H02P 29/024; H02P 29/027; H02P 2101/45; H02P 25/022; H02P 25/024; H02P 25/03; H02P 25/062; H02P 25/064; H02P 25/083; H02P 1/426; H02P 1/52; H02P 23/0027; H02P 23/28; H02M 1/327; H02M 7/537; H02M 7/5387; H02M 1/32; H02M 7/797; H02M 7/217; H02M 7/1623; B60L 2210/40; B60L 50/51; B60L 2240/525; B60L 3/003; B60L 7/14; H02J 2310/48; G01R 31/2619; G06F 2119/08

See application file for complete search history.

(56) References Cited

U.S. PATENT DOCUMENTS

| | | | |
|---|---|---|---|
| 2010/0080024 A1* | 4/2010 | Wei | H03K 17/0828 363/74 |
| 2015/0280619 A1 | 10/2015 | Marohl et al. | |
| 2015/0280633 A1 | 10/2015 | Marohl et al. | |

FOREIGN PATENT DOCUMENTS

| | | |
|---|---|---|
| JP | 2016-59114 A | 4/2016 |
| JP | 2019-198201 A | 11/2019 |
| JP | 2020-182308 A | 11/2020 |
| WO | WO 2012/105266 A1 | 8/2012 |

* cited by examiner

INVERTER, ELECTRIC DRIVE, VEHICLE AND METHOD FOR CONTROLLING CONTROLLABLE SWITCHES OF AN INVERTER AND CORRESPONDING COMPUTER PROGRAM PRODUCT

The present invention relates to an inverter, as well as an electric drive and a vehicle comprising such an inverter. The present invention also relates to a method for controlling controllable switches of an inverter and a corresponding computer program product. It is especially intended be used in an automotive vehicle.

Inverters are used to generate an AC voltage from a DC voltage provided, for instance, from a battery. Usually, the inverter comprises a DC link capacitor to smooth the DC voltage.

During operation of the inverter, elements of the inverter may heat up, potentially mitigating a reliable operation of the inverter.

An object of the invention is to prevent an overheating of at least one element of an inverter.

The object of the invention may be solved by an inverter comprising:
input terminals,
output terminals,
controllable switches connected to the input terminals and to the output terminals, and
a control device configured to control the controllable switches such that the controllable switches convert a DC voltage at the input terminals into an AC voltage at the output terminals intended to drive an electric motor, the control device being configured to control the controllable switches according to a first switching frequency and, in response to a temperature of an element of the inverter, to a second switching frequency, the control device being configured to determine the second switching frequency according to an operating point of the motor.

Reducing the switching frequency from the first switching frequency to the second switching frequency may allow to control the temperature of the element of the inverter. Furthermore, this change of switching frequency may lead to disadvantages that are more or less acceptable depending on the operating point of the motor. Thanks to the invention, it is possible to set the second switching frequency according to the operating point of the motor, so that the second switching frequency may lead to a good temperature reduction while still leading to acceptable disadvantages. For example, the second switching frequency may be reduced with respect to the first switching frequency. This reduction may lead to increased AC current ripple in phases of the motor, which in turn could lead to increased motor losses and NVH load. Motor losses and NVH load are more acceptable at low motor speed than high motor speed. Thanks to the invention, it is possible to have a high switching frequency reduction at low motor speed to comply with the acceptability level of motor losses and NVH load, and to have a low switching frequency reduction at high motor speed where motor losses and NVH load are more critical.

The relevant temperature may be measured, for instance, using an appropriate temperature sensor. Alternatively, the temperature may be estimated.

Optionally, the element is one of the controllable switches. This is advantageous because the temperature of the controllable switches is dependent on the switching frequency. Thus, according to this embodiment, the control device may be configured. to the controllable switches according to the first switching frequency and, in response to a temperature of at least one of the controllable switches of the inverter, to the second switching frequency, the control device being configured to determine the second switching frequency according to an operating point of the motor.

In particular, the temperature of all of the controllable switches may be used.

The controllable switches may be transistors, for instance, IGBTs.

Also optionally, the temperature may be a junction temperature of at least one of the transistors. This is advantageous because the junction temperature is critical to control for transistor controllable switches, in order to avoid them being damaged or destroyed.

Also optionally, the element is a DC link capacitor connected to the input terminals. This is advantageous because the temperature of the DC link capacitor is dependent on the switching frequency.

Also optionally, the operating point of the motor is a modulation index of the motor. This is advantageous because the AC current ripple is dependent on the modulation index.

Also optionally, the operating point of the motor is a rotation speed of the motor. This is advantageous because the AC current ripple is dependent on the motor speed. Furthermore, the motor speed may usually be used to determine commands for the controllable switches, so that it may be easily available.

Also optionally, the control device is further configured to pass from the first switching frequency to the second switching frequency independently from a rotation speed of the motor. In this manner, in order to control the temperature of the element of the inverter, it may not be necessary to reduce the torque of the motor at high motor speed.

The invention also relates to an electric drive comprising an inverter according to the invention and an electric motor driven by the inverter.

The invention also relates to a vehicle comprising wheels and an electric drive according to the invention for driving, at least indirectly, at least one of the wheels.

The invention also relates to a method for controlling controllable switches of an inverter, the controllable switches being connected to input terminals and to output terminals of the inverter, the method comprising controlling the controllable switches so as to convert a DC voltage at the input terminals into an AC voltage at the output terminals intended to drive an electric motor: according to a first switching frequency, and, in response to a temperature of an element of the inverter, to a second switching frequency, the control device being configured to determine the second switching frequency according to an operating point of the motor.

The invention also relates to a computer program product comprising instructions which, when the program is executed by a computer, cause the computer to carry out a method according to the invention.

Figure 2:
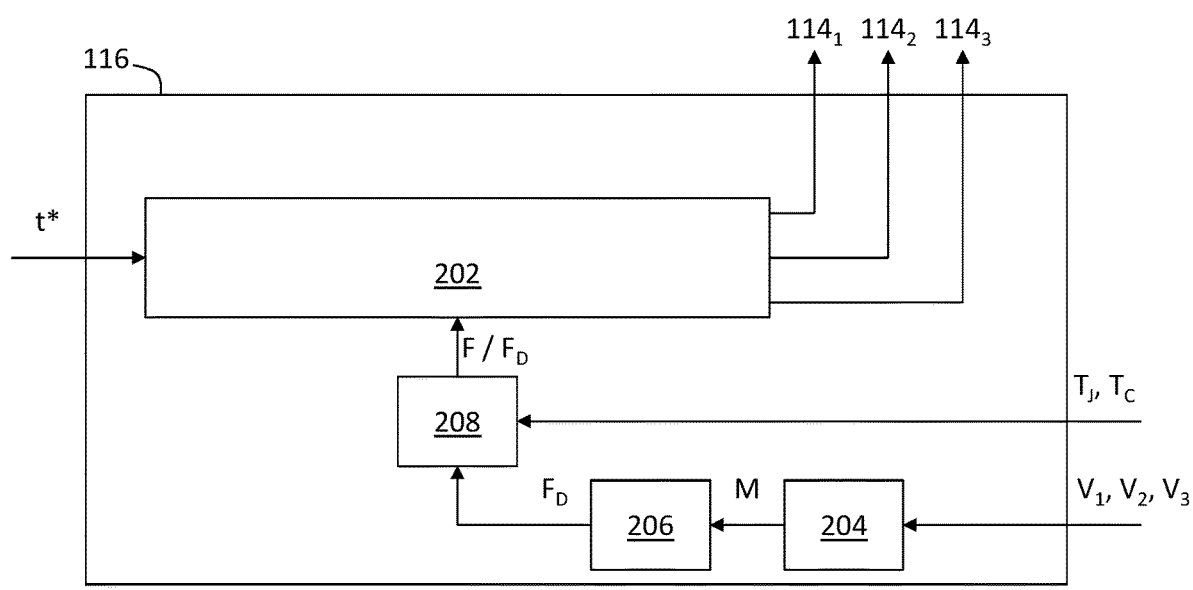
Figure 3:
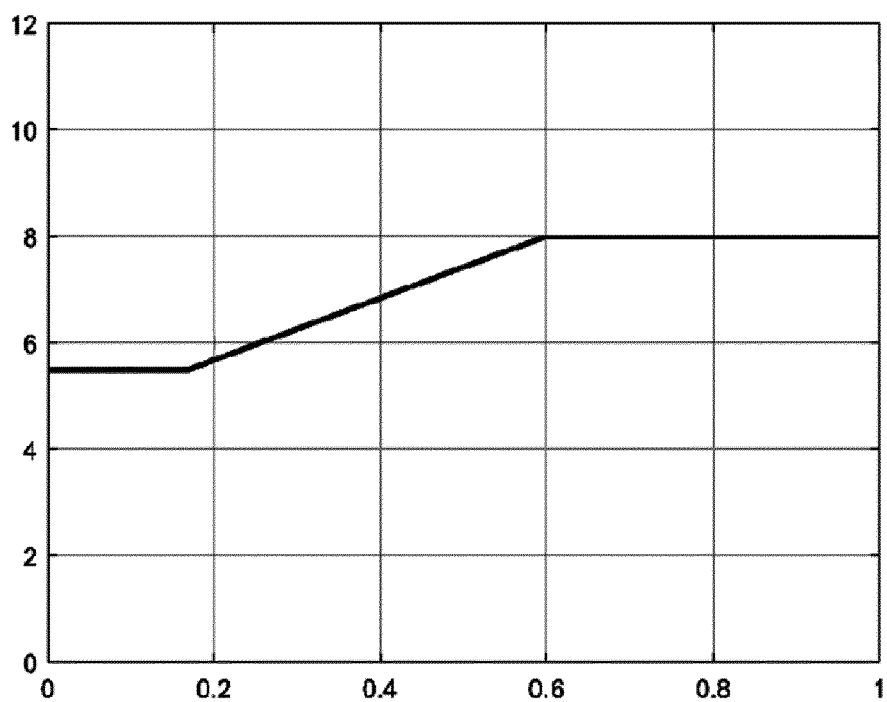
Figure 4:
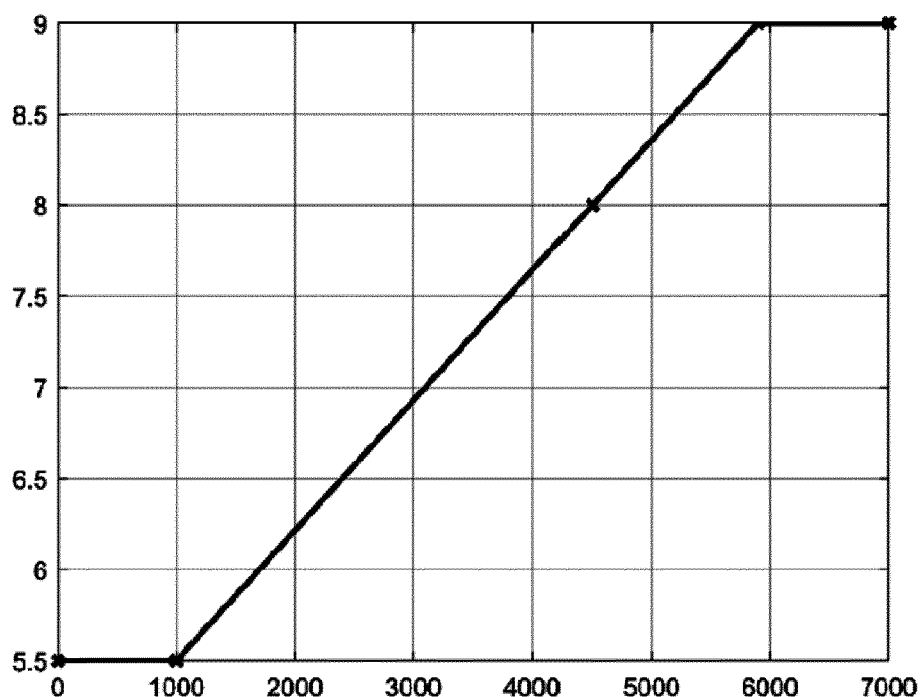

The present invention will be described more specifically with reference to the accompanying drawings, in which:

FIG. 1 is a schematic view showing an embodiment of a vehicle comprising an inverter according to the invention, FIG. 2 is an example of implementation of the inverter of FIG. 1, FIG. 3 is a graph showing a switching frequency reduction as a function of a modulation index of the motor, and FIG. 4 is a graph showing the switching frequency reduction as a function to a motor speed.

Referring to FIG. 1, a vehicle 100 according to the invention will now be described. In the described example, the vehicle 100 is an automotive vehicle.

The vehicle 100 comprises wheels 102 and an electric drive 104 configured to drive at least one of the wheels 102 at least indirectly. The vehicle 100 further comprises a DC voltage source 106, such as a battery, for electrically powering the electric drive 104. The DC voltage source 106 is configured to provide a DC voltage E.

The electric drive 104 comprises an electric motor 108 and an inverter 110 configured to drive the motor 108, for instance by supplying electric power. For example, the motor 108 is a rotary asynchronous electric motor comprising a stator and a rotor configured to rotate around a rotation axis with respect to the stator, at a rotation speed w.

The stator is provided with stator phases. In the described example, the motor 108 is a three-phase electric motor comprising three stator phases.

The inverter 110 is intended to drive the motor 108 so that phase currents flows respectively in the stator phases, so as to produce a rotating magnetic field rotating around the rotation axis.

The inverter 110 comprises input terminals IT+, IT− connected to the DC voltage source 106 so that the DC voltage E is present at the input terminals IT+, IT−. More precisely, the input terminals IT+, IT− include a positive input terminal IT+ connected to a positive terminal of the DC voltage source 106 and a negative input terminal IT− connected to a negative terminal of the DC voltage source 106 and to an electrical ground GND.

The inverter 110 further comprises output terminals OT connected to the motor 108. An AC voltage is intended to be present at the output terminals OT for powering the electric motor 108. The AC voltage may be a single or a multiphase AC voltage. In the described example where the motor 108 is a three-phase electric motor, the AC voltage is a three-phase AC voltage.

The inverter 110 further comprises controllable switches Q, Q′, called main switches, connected to the input terminals IT+, IT− and to the output terminals OT. The main switches Q, Q′ may be semi-conductor switches comprising for example transistors.

Each main switch Q, Q′ comprises for example one amongst: a Metal Oxide Semiconductor Field Effect Transistor (MOSFET), an Insulated Gate Bipolar Transistor (IGBT) and a Silicon Carbide MOSFET (SiC MOSFET).

In the described example, the inverter 110 comprises switch legs $114_{1-3}$ respectively associated to the stator phases of the motor 108. Each switch leg $114_{1-3}$ comprises a high side (HS) main switch Q′ connected to the positive input terminal IT+ and a low side (LS) main switch Q connected to the negative input terminal IT−. The HS main switch Q′ and the LS main switch Q are connected to each other at a middle point connected to the output terminal OT connected to the associated stator phase of the motor 108.

Each switch leg $114_{1-3}$ is intended to be controlled to commute between two configurations. In the first one, called high side (HS) configuration, the HS main switch Q′ is closed (on) and the LS main switch Q is open (off) so that the DC voltage E is essentially applied to the associated stator phase. In the second one, called low side (LS) configuration, the HS main switch Q′ is open (off) and the LS main switch Q is closed (on) so that a zero voltage is essentially applied to the associated stator phase.

The inverter 110 further comprises a control device 116 configured to control the main switches Q, Q′ such that the main switches Q, Q′ convert the DC voltage E into the AC voltage. In the described example, the control device 116 is configured to commute each switch leg 114 between the two configurations mentioned above.

The inverter 110 further comprises a DC link capacitor 118 connected to the input terminals IT+, IT−. The DC link capacitor 118 is configured to smooth the DC voltage E (e.g. limit voltage overshoots).

The electric drive 104 may further comprise temperature sensors 120, 122, 124 for respectively measuring a junction temperature $T_J$ of at least one of the main switches Q, Q′, the AC voltage and the DC voltage. Alternatively, one or several of this quantity could be estimated instead of being measured. Particularly, the junction temperature of all main switches Q, Q′ may be measured or estimated. It is also possible that only the junction temperature of one of the main switches Q, Q′ is measured or estimated.

Referring to FIG. 2, an example of control device 116 will now be described. In the following description, only the features of the control device 116 useful to understand the invention are described.

The control device 116 comprises a command determination module 202 configured to determine commands for the switch legs $114_{1-3}$, for example from a torque target t* determined, for instance, from activating an acceleration-pedal or a speed-controller of the vehicle. These commands are intended to make the switch legs $114_{1-3}$ switch between their HS and LS configurations. The commands are for example Pulse Width Modulation (PWM) commands. Also for example, the commands are determined according to a space vector modulation.

The command determination module 202 is configured to determine the commands according to a switching frequency that it receives.

As it will be explained below, this switching frequency is selectively a nominal switching frequency F and, in response to the temperature of an element of the inverter 110, a derating switching frequency $F_D$. Preferably, the derating switching frequency $F_D$ is lower than the nominal switching frequency F.

For example, the derating switching frequency $F_D$ is used in response to the junction temperature $T_J$ or in response to the capacitor temperature $T_C$. For example, the derating switching frequency $F_D$ is used when the junction temperature $T_J$ passes above a predefined threshold $T_{J,thd}$, or when the capacitor temperature $T_C$ passes above a predefined threshold $T_{C,thd}$. Generally, the derating switching frequency $F_D$ is dynamically determined according to an operating point of the motor 108.

To this end, the control device 116 may first comprise an operating point determination module 204

In a first embodiment, the operating point is a modulation index M of the motor 108, so that the operating point determination module 204 is configured to determine the modulation index M, for example from the DC voltage E and at least one of the phase voltages $V_{1-3}$. For example, the modulation index M is defined as: M=V/E, where V is a peak-to-peak amplitude of a fundamental harmonic of one of the phase voltages $V_{1-3}$.

The control device 116 may then further comprise a derating switching frequency determination module 206 configured to determine the derating switching frequency $F_D$ as a function of the operating point, i.e. the modulation index M in the described embodiment. Preferably, the derating switching frequency $F_D$ is dynamically determined, i.e.

updated as the modulation index M changes. For example, the derating switching frequency $F_D$ is equal to the nominal switching frequency F minus a switching frequency reduction f, which is a function of the modulation index M, according to the equation: $F_D=F-f$.

The control device 116 may then further comprise a comparison module 208 configured to compare the junction temperature $T_J$ and the capacitor temperature $T_C$ to their respective thresholds. The comparison module 208 is further configured to provide the nominal switching frequency F to the command determination module 202 when both temperatures $T_J$, $T_C$ are below their respective thresholds, and to provide the derating switching frequency $F_D$ to the command determination module 202 when at least one of the temperatures $T_J$, $T_C$ exceeds its associated threshold.

FIG. 3 illustrates an example of relationship between the switching frequency reduction f and a duty cycle DC, which directly corresponds to the modulation index M. For example, the duty cycle DC is given by: $DC=\sqrt{3}\times M$.

As illustrated, on a low interval of the modulation index M (from 0 to around 0.18 in the illustrated example), the derating switching frequency f is constant (at around 5.5 kHz in the illustrated example). Then, on a middle interval of the modulation index M (from around 0.18 to around 0.6 in the illustrated example), the derating switching frequency f increases linearly with the modulation index M. Then, on a high interval of the modulation index M (from around 0.6 to 1), the derating switching frequency f is again constant (at around 8 kHz in the illustrated example).

Thanks to the derating switching frequency $F_D$ being dependent of the operating point, it is possible to pass from the nominal switching frequency F to the second switching frequency $F_D$ independently from the motor speed w, in particular for high motor speed w.

More precisely, reducing the switching frequency from the nominal switching frequency F to the derating switching frequency $F_D$ prevents overheating of the controllable switches Q, Q', and/or the DC link capacitor 118. However, this reduction increases an AC current ripple in the stator phases, leading to increased motor, increased Noise Vibration Harshness (NVH) load. These disadvantages are less extreme at low rotor speed w than at high rotor speed w. That is why the derating switching frequency $F_D$ preferably with the modulation index M. In this manner, at high motor speed w, a low reduction of the switching frequency may be used, since it is more acceptable, leading to better temperature control. As a result, it is not necessary to reduce the phases AC current (and therefore the motor torque)

In another embodiment, the operating point determination module 204 not present and the derating switching frequency determination module 206 is configured to determine the derating switching frequency $F_D$ according to the motor speed w, either measured or estimated. Indeed, for a constant DC voltage E, the modulation index M increases if the motor speed w increases, so that it is possible to use the motor speed w instead of the modulation index M.

An example of relationship between the switching frequency reduction f and the motor speed w is illustrated on FIG. 4.

As illustrated, on a low interval of the motor speed w (from 0 to around 1 000 rpm in the illustrated example), the derating switching frequency f is constant (at around 5.5 kHz in the illustrated example). Then, on a middle interval of the motor speed w (from around 1 000 rpm to around 5 900 rpm in the illustrated example), the derating switching frequency f increases linearly with the speed w. Then, on a high interval of the motor speed (from around 5 900 rpm to 7 000 in the illustrated example), the derating switching frequency f is again constant (at around 9 kHz in the illustrated example).

The control device 116 may comprise a computer device comprising a data processing unit (such as a microprocessor) and a main memory accessible by the processing unit. The computer device may further comprise a computer program containing instructions for the processing unit, to implement the functions of the previously described modules. This computer program is for example intended to be loaded into the main memory, so that the processing unit may execute its instructions. Alternatively, all or part of these modules could be implemented in the form of hardware modules, that is to say in the form of an electronic circuit, for example microwired, not involving a computer program.

It will be noted that the invention is not limited to the embodiments described above. It will indeed appear to those skilled in the art that various modifications can be made to the embodiments described above, in the light of the teaching which has just been disclosed.

In the previous detailed description of the invention, the terms used should not be interpreted as limiting the invention to the embodiments presented in the present description, but should be interpreted to include all the equivalents within the reach of those skilled in the art by applying their general knowledge to the implementation of the teaching which has just been disclosed.

The invention claimed is:

1. Inverter comprising:
    input terminals,
    output terminals,
    controllable switches connected to the input terminals and to the output terminals, and
    a control device configured to control the controllable switches such that the controllable switches convert a DC voltage at the input terminals into an AC voltage at the output terminals intended to drive an electric motor, the control device being configured to control the controllable switches according to a first switching frequency and, in response to a temperature of an element of the inverter, to a second switching frequency, the control device being configured to determine the second switching frequency according to an operating point of the motor.

2. Inverter according to claim 1, wherein the element is one of the controllable switches.

3. Inverter according to claim 2, wherein the operating point of the motor is a modulation index of the motor.

4. Inverter according to claim 2, wherein the operating point of the motor is a rotation speed of the motor.

5. Inverter according to claim 2, wherein the control device is further configured to pass from the first switching frequency to the second switching frequency independently from a rotation speed of the motor.

6. Electric drive comprising an inverter according to claim 2 and an electric motor driven by the inverter.

7. Inverter according to claim 2, wherein the controllable switches are transistors and the temperature is a junction temperature of the transistors.

8. Inverter according to claim 7, wherein the operating point of the motor is a modulation index of the motor.

9. Inverter according to claim 7, wherein the operating point of the motor is a rotation speed of the motor.

10. Inverter according to claim 7, wherein the control device is further configured to pass from the first switching frequency to the second switching frequency independently from a rotation speed of the motor.

11. Electric drive comprising an inverter according to claim 7 and an electric motor driven by the inverter.

12. Inverter according to claim 1, comprising a DC link capacitor connected to the input terminals and configured to smooth the DC voltage and wherein the element is the DC link capacitor.

13. Inverter according to claim 12, wherein the operating point of the motor is a modulation index of the motor.

14. Inverter according to claim 1, wherein the operating point of the motor is a modulation index of the motor.

15. Inverter according to claim 1, wherein the operating point of the motor is a rotation speed of the motor.

16. Inverter according to claim 1, wherein the control device is further configured to pass from the first switching frequency to the second switching frequency independently from a rotation speed of the motor.

17. Electric drive comprising an inverter according to claim 1 and an electric motor driven by the inverter.

18. Vehicle comprising wheels and an electric drive according to claim 17 for driving, at least indirectly, at least one of the wheels.

19. Method for controlling controllable switches (Q, Q') of an inverter, the controllable switches being connected to input terminals and to output terminals of the inverter, the method comprising controlling the controllable switches so as to convert a DC voltage at the input terminals into an AC voltage at the output terminals intended to drive an electric motor:
   according to a first switching frequency, and
   in response to a temperature of an element of the inverter, to a second switching frequency, the control device being configured to determine the second switching frequency according to an operating point of the motor.

20. Computer program product comprising instructions which, when the program is executed by a computer, cause the computer to carry out a method according to claim 19.

* * * * *